United States Patent
Fu et al.

(10) Patent No.: US 12,037,479 B2
(45) Date of Patent: Jul. 16, 2024

(54) PHOSPHORUS-NITROGEN-ZINC TWO-DIMENSIONAL SUPRAMOLECULAR COATED MOLYBDENUM DISULFIDE HYBRID FLAME RETARDANT AND APPLICATION THEREOF

(71) Applicant: Jiangnan University, Wuxi (CN)

(72) Inventors: Shaohai Fu, Wuxi (CN); Dong Wang, Wuxi (CN); Hongyun Peng, Wuxi (CN); Min Li, Wuxi (CN); Liping Zhang, Wuxi (CN); Anli Tian, Wuxi (CN); Mingming Liu, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 856 days.

(21) Appl. No.: 17/148,784

(22) Filed: Jan. 14, 2021

(65) Prior Publication Data
US 2021/0130584 A1    May 6, 2021

Related U.S. Application Data

(63) Continuation of application No. PCT/CN2020/078518, filed on Mar. 10, 2020.

(30) Foreign Application Priority Data

Mar. 12, 2019    (CN) .......................... 201910187910.8

(51) Int. Cl.
*C08K 9/04*    (2006.01)
*C08K 3/30*    (2006.01)
(Continued)

(52) U.S. Cl.
CPC ................. *C08K 9/04* (2013.01); *C08K 3/30* (2013.01); *C09K 21/04* (2013.01); *C09K 21/10* (2013.01);
(Continued)

(58) Field of Classification Search
CPC .... C08K 9/04; C08K 3/30; C08K 2003/3009; C09K 21/04; C09K 21/10; C09K 21/12; C09K 21/14; D01F 1/07; D01F 6/54
See application file for complete search history.

(56) References Cited

U.S. PATENT DOCUMENTS

2005/0250885 A1*  11/2005  Mercx ................. C08K 5/5313
                                                      524/196
2008/0241529 A1   10/2008  Bauer et al.
(Continued)

FOREIGN PATENT DOCUMENTS

CN          1997699 A      7/2007
CN        107501868 A     12/2017
(Continued)

OTHER PUBLICATIONS

Englsih language translation of CN107501868, pp. 1-15.*

*Primary Examiner* — Alexander C Kollias
(74) *Attorney, Agent, or Firm* — IPRO, PLLC

(57) ABSTRACT

The disclosure discloses a phosphorus-nitrogen-zinc two-dimensional supramolecular coated molybdenum disulfide hybrid flame retardant and application thereof, and belongs to the technical field of halogen-free flame retardant. Components of the phosphorus-nitrogen-zinc two-dimensional supramolecular coated molybdenum disulfide hybrid material in the disclosure include, by weight, 1-2 parts of molybdenum disulfide, 1-1.5 parts of zinc salt, 5-8 parts of a nitrogen-containing compound and 5-10 parts of a phosphorus-containing compound. As a flame retardant, the hybrid material of the disclosure effectively exerts an organic-inorganic synergistic flame retardant effect; the flame retardant efficiency of molybdenum disulfide is improved; the addition amount of the flame retardant in a matrix is reduced; the mechanical properties of the matrix can be improved at the same time; and the material has a very good application prospect.

10 Claims, 5 Drawing Sheets

(51) Int. Cl.
  *C09K 21/04* (2006.01)
  *C09K 21/10* (2006.01)
  *C09K 21/12* (2006.01)
  *C09K 21/14* (2006.01)
  *D01F 1/07* (2006.01)
  *D01F 6/54* (2006.01)
(52) U.S. Cl.
  CPC .............. *C09K 21/12* (2013.01); *C09K 21/14* (2013.01); *D01F 1/07* (2013.01); *D01F 6/54* (2013.01); *C08K 2003/3009* (2013.01)

(56) References Cited

U.S. PATENT DOCUMENTS

| | | | | |
|---|---|---|---|---|
| 2014/0212587 | A1* | 7/2014 | Malshe | ................ C10M 177/00 106/18.32 |
| 2018/0229471 | A1* | 8/2018 | Zhu | ..................... B01J 13/0091 |
| 2019/0143286 | A1* | 5/2019 | Wang | ..................... C09K 23/22 523/205 |

FOREIGN PATENT DOCUMENTS

| | | | |
|---|---|---|---|
| CN | 109942891 | A | 6/2019 |
| KR | 20150068866 | A | 6/2015 |

* cited by examiner

PHOSPHORUS-NITROGEN-ZINC TWO-DIMENSIONAL SUPRAMOLECULAR COATED MOLYBDENUM DISULFIDE HYBRID FLAME RETARDANT AND APPLICATION THEREOF

TECHNICAL FIELD

The disclosure specifically relates to a phosphorus-nitrogen-zinc two-dimensional supramolecular coated molybdenum disulfide hybrid flame retardant and application thereof, and belongs to the technical field of halogen-free flame retardant.

BACKGROUND

In recent years, the application fields of various civil, decorative and industrial fibers have been expanded rapidly and become an indispensable part of daily life and industrial production. However, most fibers are highly flammable, are easily ignited by external heat sources and release a large amount of heat, smoke and toxic gases during the combustion process, which seriously endanger the safety of life and property. The development of high-performance and low-consumption flame retardants is an effective way to improve the added value and safety of fiber products, and make the fiber products be not likely to catch fire or reduce the burning speed.

Traditional flame retardants are mostly halogen-based flame retardants or derivatives of halogen-based and other flame retardants. The combustion of such flame retardants will release toxic and harmful gases and seriously endanger human health. In recent years, halogen-free flame retardants such as phosphorus-based flame retardants, nitrogen-based flame retardants and silicon-based flame retardants have been widely developed due to the advantages of environmental protection and excellent flame retardant efficiency. However, when added to material matrices, such flame retardants have the problems of high consumption (>20%), poor compatibility, poor durability, poor thermal stability and the like, which have a great impact on mechanical properties of fibers and other matrix materials.

Molybdenum disulfide, as a new two-dimensional nano flame retardant material, has relatively low thermal conductivity and high melting point (1185° C.), which can effectively inhibit the penetration of external heat and oxygen and the release of toxic substances. Molybdenum atoms can also catalyze the matrices to form a large amount of carbon layers to reduce heat exchange. However, when molybdenum disulfide is added for use alone, the improvement of the flame retardant degree of polymers is limited. Literatures show that the rational preparation of an ordered organic-inorganic hybrid structure from molybdenum disulfide and other flame retardant molecules can achieve an excellent flame retardant effect, for example, in 2016, Xiaming Feng et al. published a sandwich structure of a melamine-cyanuric acid supramolecular/molybdenum disulfide (MCA/MoS$_2$) hybrid material prepared by a self-assembly method in *Journal of Hazardous Materials*, Vol.320, pp. 252-264, and the flame retardant material can effectively reduce the fire hazard of polyamide; Keqing Zhou reported a research on the use of a molybdenum disulfide nanosheet/silica hybrid material in flame-retardant epoxy resin in *Journal of Hazardous Materials*, Vol. 344, pp. 1078-1089 (2018), and this material can effectively improve the flame retardant performance of epoxy resin. However, according to currently reported methods, the addition amount of molybdenum disulfide flame retardants is high, and the flame retardant efficiency is low. Therefore, it is very meaningful to develop a flame retardant with low dosage and high efficiency.

SUMMARY

The disclosure discloses a phosphorus-nitrogen-zinc two-dimensional supramolecular coated molybdenum disulfide hybrid material, and components of the material include, by weight, 1-2 parts of molybdenum disulfide, 1-1.5 parts of zinc salt, 5-8 parts of a nitrogen-containing compound and 5-10 parts of a phosphorus-containing compound.

In an embodiment of the disclosure, the zinc salt includes one or more of zinc acetate, zinc chloride and zinc nitrate.

In an embodiment of the disclosure, the nitrogen-containing compound includes one or more of polyethyleneimine, melamine, p-phenylenediamine, ethylenediamine and thiourea.

In an embodiment of the disclosure, the phosphorus-containing compound includes one or more of phytic acid, 2-phosphonobutane-1,2,4-tricarboxylic acid, amino trimethylene phosphonic acid and ethylenediamine tetramethylene phosphonic acid.

In an embodiment of the disclosure, a preparation method of the hybrid material includes: preparing the components according to parts by weight and mixing molybdenum disulfide nanosheets, the zinc salt, the nitrogen-containing compound and the phosphorus-containing compound in an aqueous solution for a complete reaction to obtain the hybrid material.

In an embodiment of the disclosure, the reaction temperature is 10-60° C., and the time is 2-8 hours.

The disclosure also discloses a flame retardant polyacrylonitrile fiber, which contains the hybrid material above.

The disclosure also discloses a preparation method of the flame retardant polyacrylonitrile fiber. The method includes adding the phosphorus-nitrogen-zinc two-dimensional supramolecular coated molybdenum disulfide hybrid material into a polyacrylonitrile spinning solution and carrying out wet spinning to obtain the flame retardant polyacrylonitrile fiber.

In an embodiment of the disclosure, the addition amount of the hybrid material is 1%-3% of the mass of the flame retardant polyacrylonitrile fiber.

The disclosure also discloses application of the phosphorus-nitrogen-zinc two-dimensional supramolecular coated molybdenum disulfide hybrid material or the flame retardant polyacrylonitrile fiber in the field of flame retardant.

The Beneficial Effects of the Disclosure are:

The phosphorus-nitrogen-zinc two-dimensional supramolecular coated molybdenum disulfide hybrid material of the disclosure is prepared by utilizing crosslinking among $Zn^{2+}$, the nitrogen-containing compound and phosphorus-containing molecules for self-assembly on the surface of molybdenum disulfide to form phosphorus-nitrogen-zinc two-dimensional supramolecules, and the preparation method is simple and environmentally friendly.

As a flame retardant, the hybrid material of the disclosure effectively exerts an organic-inorganic synergistic flame retardant effect; the flame retardant efficiency of molybdenum disulfide is improved; the addition amount of the flame retardant in a matrix is reduced; and a flame retardant fiber with good flame retardant effect can be obtained with a small amount (2 wt %) of the material, wherein the maximum heat release rate is not higher than 100 W/g, the residual carbon amount is not lower than 57%, the limit oxygen index is greater than 27 (nonflammable grade), the mechanical properties of the matrix cannot be affected at the same time, and the material has a very good application prospect.

In order to reduce the addition amount of the flame retardant in the matrix and improve the flame retardant efficiency of molybdenum disulfide, the disclosure designs a phosphorus-nitrogen-zinc two-dimensional supramolecular coated molybdenum disulfide hybrid flame retardant, which effectively exerts an organic-inorganic synergistic flame retardant effect, and this flame retardant material can simultaneously improve the mechanical properties of the matrix.

DETAILED DESCRIPTION

A test method: in the disclosure, a miniature calorimeter is used to measure the heat release rate and the total heat release amount; a thermogravimetric analyzer is used to measure the thermogravimetric (TG) diagram; a limit oxygen index instrument is used to measure the limit oxygen index of a fabric made of the flame retardant fiber (GB 5454-1997, LOI<22, inflammable; 22≤LOI≤27, flammable; LOI>27, nonflammable); an XQ-2 single fiber strength tester is used to test the strength of the flame retardant polyacrylonitrile fiber.

EXAMPLE 1

Preparation of a flame retardant: 0.5 g of melamine and 0.1 g of zinc acetate are dissolved in 200 mL of deionized water, and then 0.1 g of molybdenum disulfide nanosheets are added into the aqueous solution and ultrasonically dispersed uniformly for 2 hours to obtain a dispersion; 0.5 g of phytic acid is slowly added dropwise into the dispersion and stirred at 30° C. for 4 hours. Finally, the mixture is subjected to centrifugal cleaning with deionized water and vacuum drying at 60° C. to obtain a phosphorus-nitrogen-zinc two-dimensional supramolecular coated molybdenum disulfide hybrid material.

Figure 1:
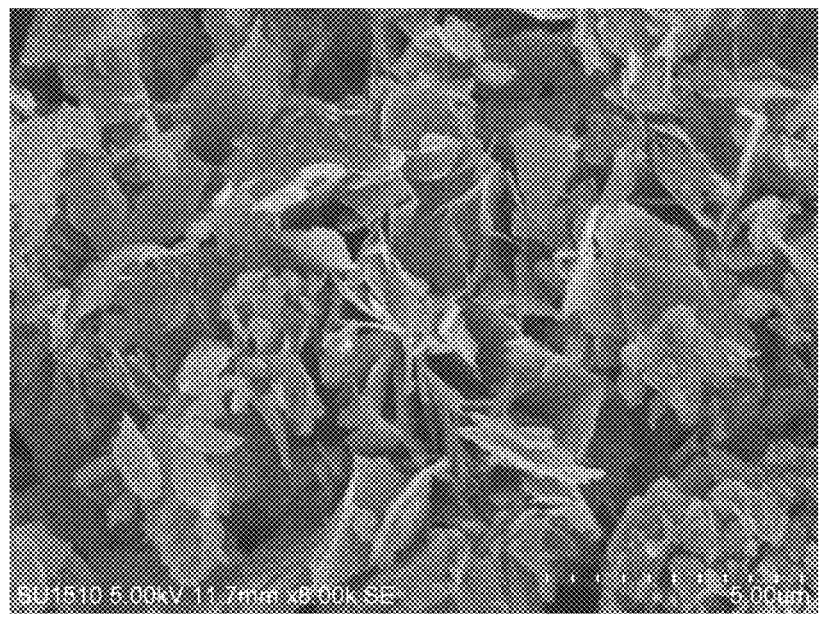
FIG. 1 is an SEM diagram of a phosphorus-nitrogen-zinc two-dimensional supramolecular coated molybdenum disulfide hybrid material obtained in Example 1.
Figure 2:
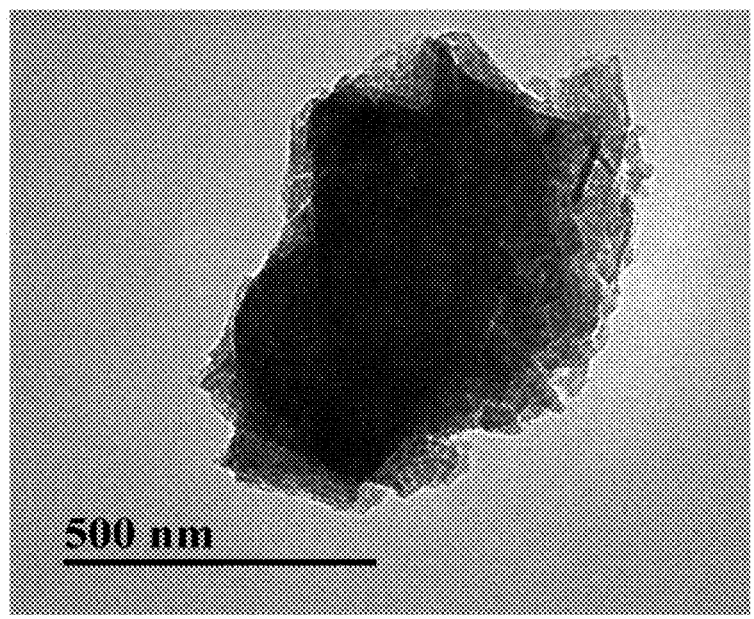
FIG. 2 is a TEM diagram of the phosphorus-nitrogen-zinc two-dimensional supramolecular coated molybdenum disulfide hybrid material obtained in Example 1.
Figure 3:
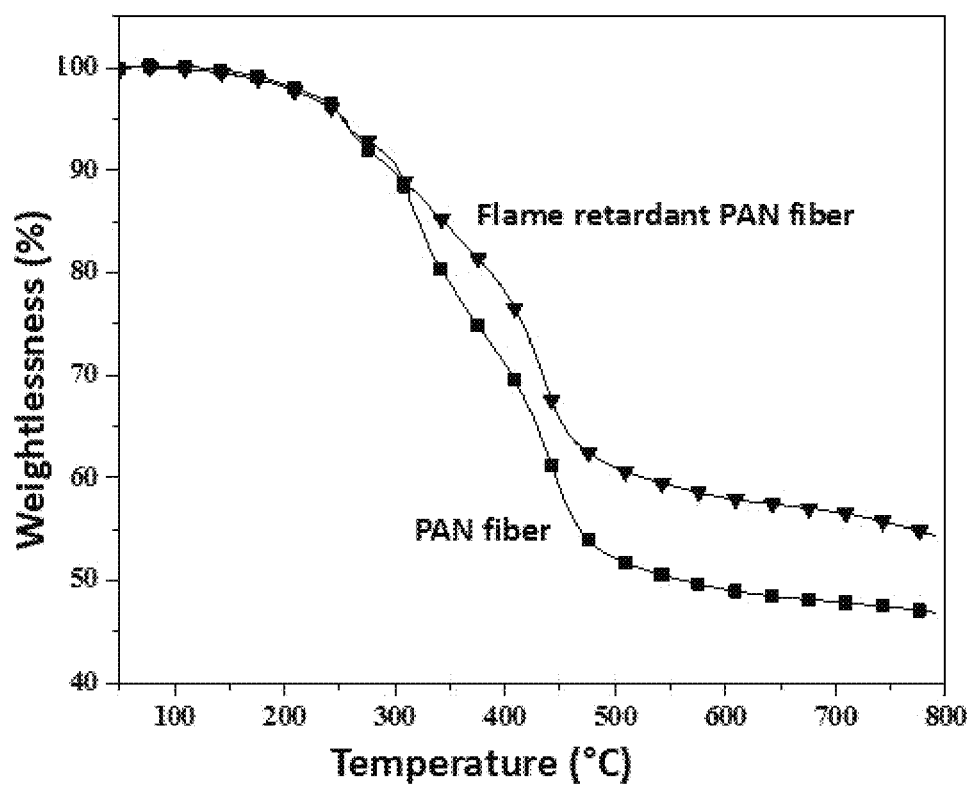
FIG. 3 is a thermogravimetric (TG) diagram of a polyacrylonitrile fiber and flame retardant polyacrylonitrile fiber obtained in Example 1.
Figure 4:
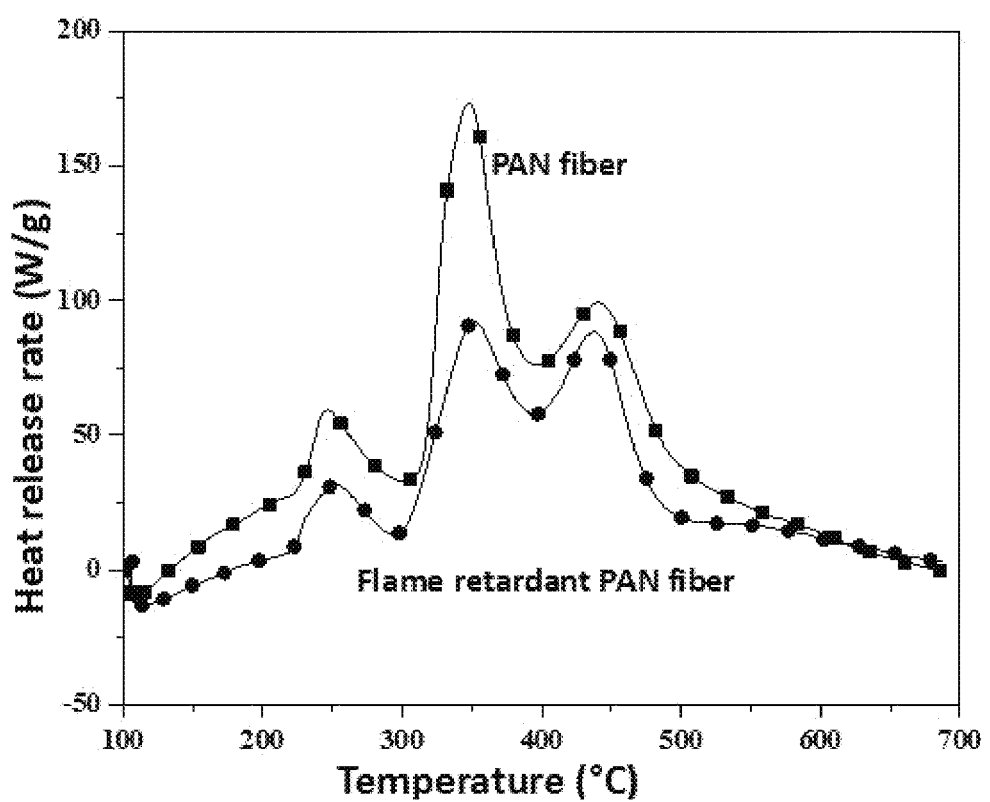
FIG. 4 is a diagram showing the heat release rate of the polyacrylonitrile fiber and flame retardant polyacrylonitrile fiber obtained in Example 1.
Figure 5:
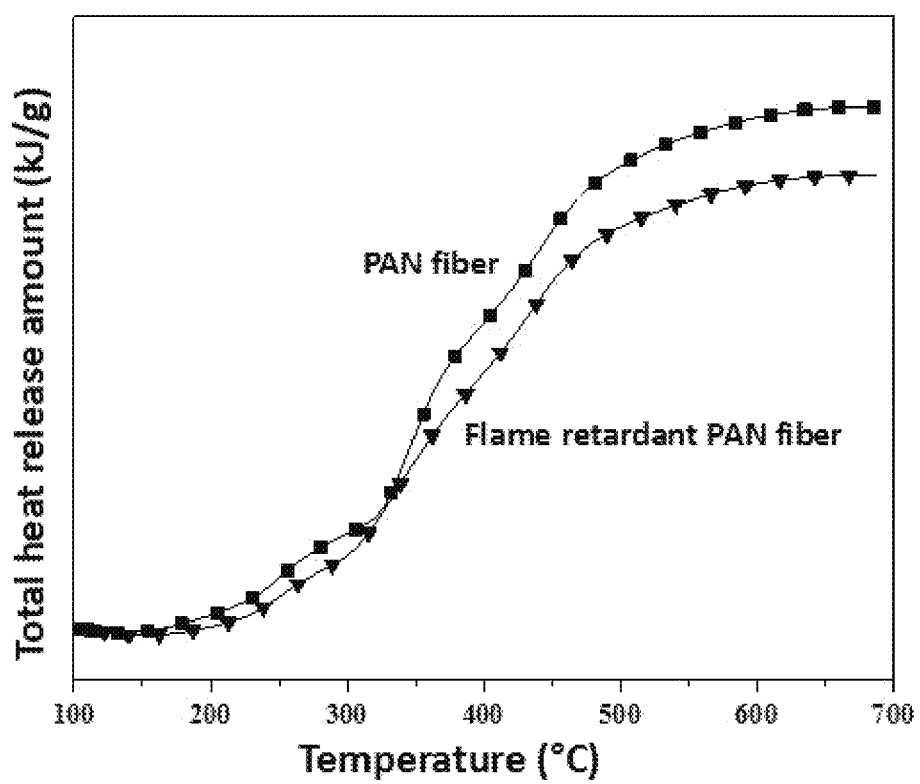
FIG. 5 is a diagram showing the total heat release amount of the polyacrylonitrile fiber and flame retardant polyacrylonitrile fiber obtained in Example 1.
Figure 6:
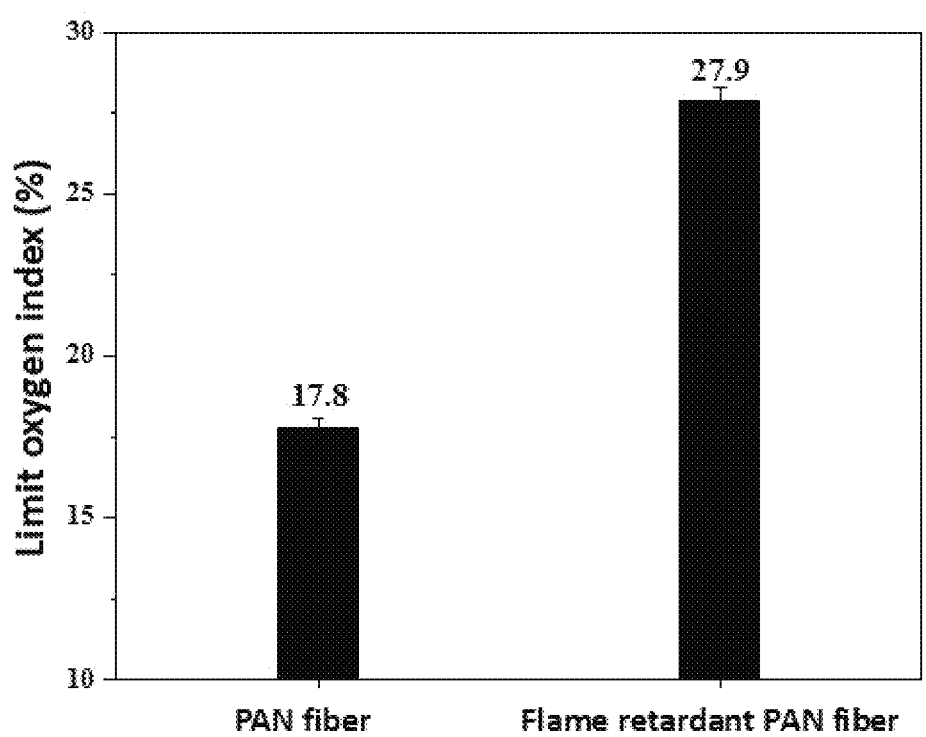
FIG. 6 is a diagram showing the limit oxygen index of the polyacrylonitrile fiber and flame retardant polyacrylonitrile fiber obtained in Example 1.

After SEM and TEM tests, corresponding topography diagrams are obtained and shown in FIG. 1 and FIG. 2 respectively. According to FIGS. 1 to 2, it can be seen that the surface of the obtained hybrid material is rough, the surfaces of the molybdenum disulfide nanosheets have block-like loads, presenting an obvious sandwich structure, and the molybdenum disulfide nanosheets are successfully coated with the surface flake two-dimensional supramolecules.

Preparation of a flame retardant polyacrylonitrile fiber: 0.06 g of the phosphorus-nitrogen-zinc two-dimensional supramolecular coated molybdenum disulfide hybrid material is weighed and ultrasonically dispersed in 15 g of N,N-dimethylformamide, 3 g of polyacrylonitrile powder is added and dissolved at 80° C. for 8 hours, and then the mixture is placed in a vacuum oven at 60° C. for 2 hours for defoaming to obtain a spinning solution. The obtained spinning solution is subjected to spinning with a TYD01 spinning syringe pump. The spinning parameters are: speed 10 μL min$^{-1}$, needle inner diameter 0.3 mm, and coagulation bath DMF aqueous solution (DMF content 60%); an obtained polyacrylonitrile fiber is dried at 60° C. for 24 hours to obtain the flame retardant polyacrylonitrile fiber.

The obtained flame retardant polyacrylonitrile fiber is subjected to thermogravimetric analysis, heat release rate test, total heat release amount test and limit oxygen index test, and results are shown in FIG. 3 to FIG. 6 respectively. The specific performance results are shown in Table 1.

EXAMPLE 2

Preparation of a flame retardant: 0.8 g of melamine and 0.15 g of zinc acetate are dissolved in 200 mL of deionized water, and then 0.2 g of molybdenum disulfide nanosheets are added into the solution and ultrasonically dispersed uniformly for 2 hours to obtain a dispersion; 1 g of phytic acid is slowly added dropwise into the dispersion and stirred at 30° C. for 4 hours. Finally, the mixture is subjected to centrifugal cleaning with deionized water and vacuum drying at 60° C. to obtain a phosphorus-nitrogen-zinc two-dimensional supramolecular coated molybdenum disulfide hybrid material.

Preparation of a flame retardant polyacrylonitrile fiber: With reference to Example 1, a flame retardant polyacrylonitrile fiber is prepared. The specific performance parameters are shown in Table 1.

EXAMPLE 3

Preparation of a flame retardant: 0.5 g of melamine and 0.1 g of zinc acetate are dissolved in 200 mL of deionized water, and then 0.1 g of molybdenum disulfide nanosheets are added into the solution and ultrasonically dispersed uniformly for 2 hours to obtain a dispersion; 0.5 g of phytic acid is slowly added dropwise into the dispersion and stirred at 60° C. for 4 hours. Finally, the mixture is subjected to centrifugal cleaning with deionized water and vacuum drying at 60° C. to obtain a phosphorus-nitrogen-zinc two-dimensional supramolecular coated molybdenum disulfide hybrid material.

Preparation of a flame retardant polyacrylonitrile fiber: With reference to Example 1, a flame retardant polyacrylonitrile fiber is prepared. The specific performance parameters are shown in Table 1.

EXAMPLE 4

Preparation of a flame retardant: 0.5 g of polyethyleneimine and 0.1 g of zinc acetate are dissolved in 200 mL of deionized water, and then 0.1 g of molybdenum disulfide nanosheets are added into the solution and ultrasonically dispersed uniformly for 2 hours to obtain a dispersion; 0.8 g of phytic acid is slowly added dropwise into the dispersion and stirred at 10° C. for 8 hours. Finally, the mixture is subjected to centrifugal cleaning with deionized water and vacuum drying at 60° C. to obtain a phosphorus-nitrogen-zinc two-dimensional supramolecular coated molybdenum disulfide hybrid material.

Preparation of a flame retardant polyacrylonitrile fiber: With reference to Example 1, a flame retardant polyacrylonitrile fiber is prepared. The specific performance parameters are shown in Table 1.

EXAMPLE 5

Preparation of a flame retardant: 0.5 g of polyethyleneimine and 0.1 g of zinc acetate are dissolved in 200 mL of deionized water, and then 0.2 g of molybdenum disulfide nanosheets are added into the solution and ultrasonically dispersed uniformly for 2 hours to obtain a dispersion; 1 g of amino trimethylene phosphonic acid is slowly added dropwise into the dispersion and stirred at 30° C. for 4 hours. Finally, the mixture is subjected to centrifugal cleaning with deionized water and vacuum drying at 60° C. to obtain a phosphorus-nitrogen-zinc two-dimensional supramolecular coated molybdenum disulfide hybrid material.

Preparation of a flame retardant polyacrylonitrile fiber: With reference to Example 1, a flame retardant polyacrylonitrile fiber is prepared. The specific performance parameters are shown in Table 1.

EXAMPLE 6

A flame retardant material is prepared with reference to Example 1, and then with reference to the preparation method of the flame retardant polyacrylonitrile fiber in Example 1, a flame retardant PAN fiber is prepared by only changing the amount of the flame retardant into 0.3 g and keeping other conditions unchanged. The specific performance parameters are shown in Table 1.

TABLE 1

Flame retardant performance data of flame retardant PAN fibers in different examples

| Sample | Residual carbon amount (%) | Maximum heat release rate (W/g) | Total heat release amount (kJ/g) | Limit oxygen index (%) | Breaking strength (cN) | Elongation at break (%) |
|---|---|---|---|---|---|---|
| Pure PAN fiber | 48.5 | 182.4 | 26.6 | 17.8 | 56.3 | 7.2 |
| Example 1 | 60.2 | 84.6 | 19.9 | 27.9 | 84.6 | 9.2 |
| Example 2 | 58.8 | 91.3 | 20.2 | 27.2 | 76.8 | 8.3 |
| Example 3 | 59.1 | 88.7 | 20.7 | 27.5 | 81.2 | 8.6 |
| Example 4 | 58.3 | 92.1 | 18.5 | 27.2 | 77.5 | 7.9 |
| Example 5 | 58.4 | 90.2 | 20.8 | 27.4 | 79.8 | 8.7 |
| Example 6 | 64.3 | 78.6 | 17.8 | 28.8 | 53.2 | 6.8 |

EXAMPLE 7

Optimization of Preparation Conditions of a Flame Retardant

With reference to Example 1, the addition amount mass ratio of molybdenum disulfide to zinc acetate to melamine to phytic acid is replaced with the amount ratio shown in Table 2 to prepare a flame retardant PAN fiber. The specific performance parameters of an obtained flame retardant PAN fiber are shown in Table 2.

TABLE 2

Flame retardant performance of flame retardants prepared according to different mass ratios of molybdenum disulfide to zinc acetate to melamine to phytic acid

| Mass part ratio of molybdenum disulfide to zinc acetate to melamine to phytic acid | Residual carbon amount (%) | Maximum heat release rate (W/g) | Total heat release amount (kJ/g) | Limit oxygen index (%) |
|---|---|---|---|---|
| 0.5:1:5:5 | 54.2 | 125.2 | 24.4 | 25.4 |
| 1:0.5:5:5 | 56.4 | 136.2 | 22.5 | 26.7 |
| 1:1:15:10 | 56.8 | 129.9 | 21.2 | 26.4 |

COMPARATIVE EXAMPLE 1

With reference to the preparation method of the flame retardant polyacrylonitrile fiber in Example 1, flame retardant compounds are respectively replaced with a melamine-cyanuric acid supramolecular/molybdenum disulfide (MCA/MoS2) hybrid material and a molybdenum disulfide nanosheet/silicon dioxide hybrid material to obtain flame retardant polyacrylonitrile fibers. The obtained performance results are shown in Table 3.

TABLE 3

Performance results of flame retardant polyacrylonitrile fibers prepared by different flame retardants

| Flame retardant | Residual carbon amount (%) | Maximum heat release rate (W/g) | Total heat release amount (kJ/g) | Limit oxygen index (%) |
|---|---|---|---|---|
| MCA/$MoS_2$ hybrid material | 55.8 | 112.3 | 23.7 | 25.9 |
| Molybdenum disulfide nanosheet/silicon dioxide hybrid material | 55.5 | 116.6 | 25.9 | 25.5 |

What is claimed is:

1. A phosphorus-nitrogen-zinc two-dimensional supra molecular coated molybdenum disulfide hybrid material, comprising the following components by weight: 1-2 parts of molybdenum disulfide, 1-1.5 parts of zinc salt, 5-8 parts of a nitrogen-containing compound and 5-10 parts of a phosphorus-containing compound.

2. The phosphorus-nitrogen-zinc two-dimensional supra molecular coated molybdenum disulfide hybrid material according to claim 1, wherein the phosphorus-containing compound comprises one or more of phytic acid, 2-phosphonobutane-1,2,4-tricarboxylic acid, amino trimethylene phosphonic acid or ethylenediamine tetramethylene phosphonic acid.

3. The phosphorus-nitrogen-zinc two-dimensional supra molecular coated molybdenum disulfide hybrid material according to claim 1, wherein the zinc salt comprises one or more of zinc acetate, zinc chloride or zinc nitrate.

4. The phosphorus-nitrogen-zinc two-dimensional supra molecular coated molybdenum disulfide hybrid material according to claim 1, wherein the nitrogen-containing compound comprises one or more of polyethyleneimine, melamine, p-phenylenediamine, ethylenediamine or thiourea.

5. The phosphorus-nitrogen-zinc two-dimensional supra molecular coated molybdenum disulfide hybrid material according to claim 1, wherein a preparation method of the phosphorus-nitrogen-zinc two-dimensional supra molecular coated molybdenum disulfide hybrid material comprises: preparing the components according to parts by weight and mixing molybdenum disulfide nanosheets, the zinc salt, the nitrogen containing compound and the phosphorus-containing compound in an aqueous solution for a complete reaction to obtain the phosphorus-nitrogen-zinc two-dimensional supra molecular coated molybdenum disulfide hybrid material.

6. The phosphorus-nitrogen-zinc two-dimensional supra molecular coated molybdenum disulfide hybrid material according to claim 5, wherein a reaction temperature is 10-60° C.

7. The phosphorus-nitrogen-zinc two-dimensional supra molecular coated molybdenum disulfide hybrid material according to claim 1, wherein the phosphorus-containing compound is one or more of phytic acid, 2-phosphonobutane-1,2,4-tricarboxylic acid, amino trimethylene phosphonic acid or ethylenediamine tetramethylene phosphonic acid;

the zinc salt is one or more of zinc acetate, zinc chloride or zinc nitrate; and the nitrogen-containing compound is one or more of polyethyleneimine, melamine, p-phenylenediamine, ethylenediamine or thiourea.

8. A flame retardant polyacrylonitrile fiber with components containing the phosphorus-nitrogen-zinc two-dimensional supra molecular coated molybdenum disulfide hybrid material according to claim 1.

9. The flame retardant polyacrylonitrile fiber according to claim 8, wherein a preparation method of the flame retardant polyacrylonitrile fiber comprises adding the phosphorus-nitrogen-zinc two-dimensional supra molecular coated molybdenum disulfide hybrid material according to claim 1 into a polyacrylonitrile spinning solution and then carrying out wet spinning.

10. The flame retardant polyacrylonitrile fiber according to claim 9, wherein a content of the phosphorus-nitrogen-zinc two-dimensional supra molecular coated molybdenum disulfide hybrid material is 1%-3% of mass of the flame retardant polyacrylonitrile fiber.

* * * * *